United States Patent Office 3,043,209
Patented July 10, 1962

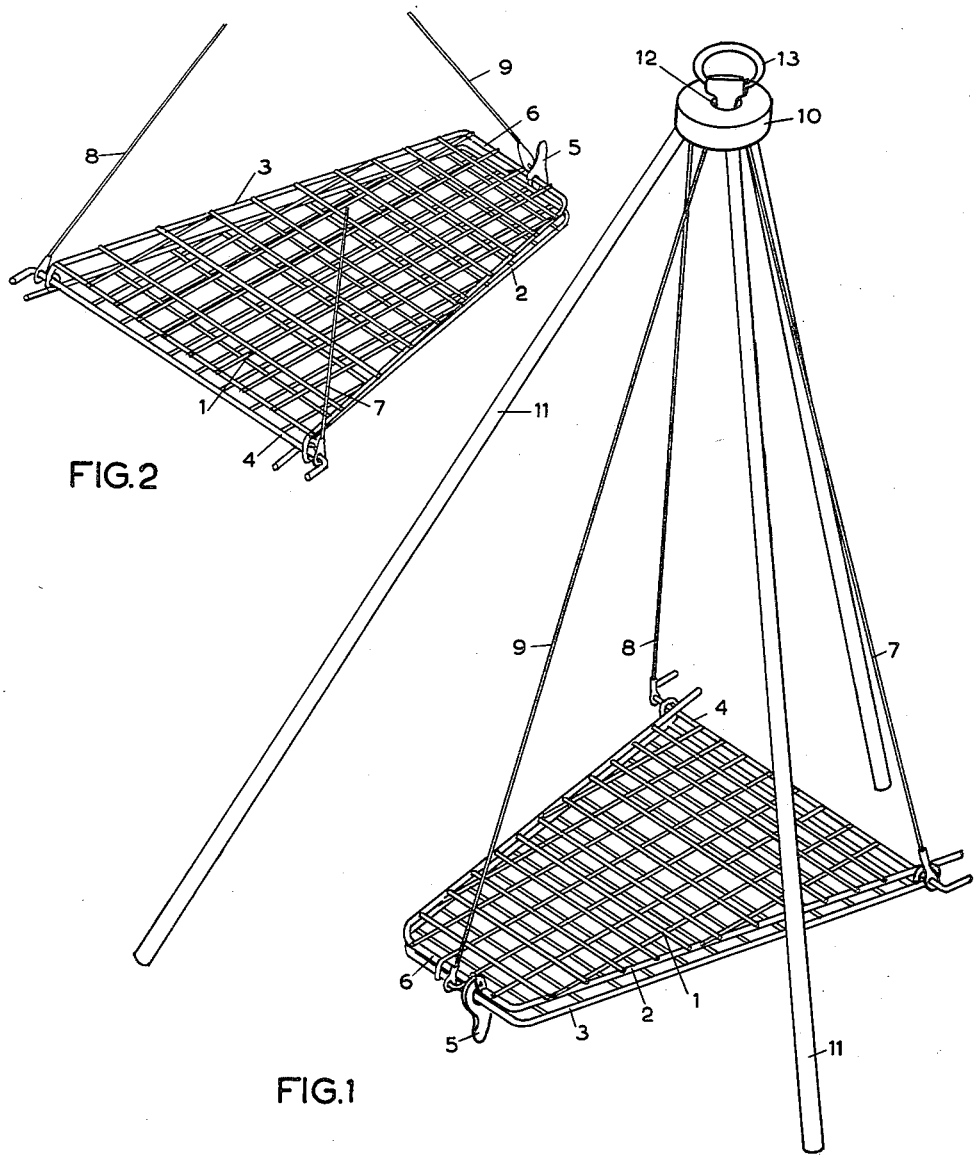

3,043,209
GRILLER FOR COOKING MEAT AND THE LIKE
Walter R. Sutherland and Charles John Sutherland, both of 18 Tecoma Crescent, Thornton Estate, Goodwood, Cape Province, Union of South Africa
Filed June 9, 1959, Ser. No. 819,117
5 Claims. (Cl. 99—397)

This invention relates to a griller for cooking meat and other food, and is particularly adapted for use when cooking is to be performed in the open air as at a picnic.

One of the difficulties encountered when grilling meat over an open fire, is to avoid the concentration of heat at one spot and another is to turn the grid which holds the meat when one side of the meat is cooked. It is well known that this latter operation is often particularly unpleasant owing to the heat and smoke from the fire. An object of this invention is to provide means by which the grilling operation may be performed more effectively and without the unpleasantness above mentioned.

In accordance with this invention there is provided a griller comprising double open mesh walls forming a flat grid, suspension means above the centre of the grid, three supports depending from said suspension means, one of said supports being upwardly withdrawable and means linking the bottom of said supports to the grid at points defining the apexes of a triangle.

The invention further provides for the two walls of the grid to be of truncated triangle shape and hinged at one edge and held shut with a releasable catch at the opposite edge, for the wtihdrawable support to be a flexible cable and to terminate in a ring at the point of suspension and for the latter to be at the apex of a supporting tripod.

One preferred embodiment of the invention is illustrated in the accompanying drawing in which:
FIG. 1 is an elevational view of the griller, and
FIG. 2 is a view of the griller looking in the opposite direction of FIG. 1.

In the drawing 1 illustrates a flat double grid. The grid 1 is of truncated triangular shape and the two mesh walls 2, 3 are identical and hinged together along one edge at 4.

A simple easily releasable catch 5 to hold the walls 2, 3 of grid 1 together is as shown located at the truncated side 6 of the grid 1 opposite side 4.

The grid 1 is suspended by three supports 7, 8, 9 of substantially equal length which are loosely attached to the centre of side 6 and the corners at the ends of side 4. The attachment may be by a hook and ring or any other suitable means which is easily detachable.

The supports 7 and 8 may be rods, chains or cables but support 9 should be flexible and be in the form of a chain or cable and preferably the latter. Supports 7 and 8 are loosely attached to a fixed ring shaped suspension means 10 and the flexible support 9 is also led to the same part 10 but is provided with some means by which it may normally be held in position, but when necessary can be drawn through part 10, to raise the side 6 upwardly towards the part 10.

The part 10 may be attached to any convenient structure but as shown it forms the apex of a tripod 11. The tops of the legs of the tripod 11 are hinged to the part 10. Conveniently the part 10 in the form of a cap is shown as having a hole 12 through which the end of the flexible support 9 passes freely and is attached to the ring 13 by which the support 9 may be pulled to raise the side 6 of the grid 1.

In use with a fire made and the viands to be cooked or toasted placed on wall 3 of grid 1 and the wall 2 closed down over them to hold them in place by means of a catch 5, the tripod 11 is placed to straddle the fire with the loaded grid 1 raised a sufficient distance above the fire.

The cooking now starts; if it is too fierce at one particular spot the grid may be set swinging on its supports 7, 8, 9 and at any time the viands may be turned over to be grilled on the other side by simply reversing the top and bottom of the grid 1. Thus if wall 3 of grid 1 was originally directed towards the fire a steady pull on the ring 13 will raise side 6 till the grid is vertically suspended between the supports 7 and 8. This upward swing of the grid 1 can easily be made to continue so that it will tip from the vertical ready to fall in the opposite direction and the grid 1 is thus turned over. This turning of the grid 1 may be repeated as often as required by the cook.

It will be appreciated that the grid 1 may be any shape provided that in swinging over it does not become obstructed by the supports 7, 8. The area of the grid should therefore not project beyond the area of the triangle defined by the side 4 and supports 7, 8.

If due to wind or other conditions the close approach to the fire may be dangerous or objectionable the end of a long rod inserted in ring 13 may be made to operate the grid 1 as described.

When cooking is complete the end of a rod under the part 10 may be used to lift the whole tripod 11 with the supported grid away from the fire when the catch 5 may be opened and the top part of grid 1 lifted to make the viands available for distribution.

What we claim as new and desire to secure by Letters Patent is:

1. A griller including a grid comprising a pair of flat mesh wall portions, said wall portions having a first end edge portion and being hinged together adjacent said one end edge portion, the wall portions having opposite side edge portions extending away from said one end edge portion and tapering toward one another to an opposite end edge portion, means for selectively preventing separation of said opposite end edge portions, an open supporting structure including an apex portion, a pair of suspension members having the upper end portions thereof secured to said supporting structure at said apex portion and having the lower end portions thereof loosely attached to said wall portions at points adjacent the corners defined by said first end edge portion and said side edge portions for permitting swinging movement of the wall portions about said points of attachment, and a flexible suspension member having the lower end portion thereof loosely attached to the opposite end edge portion of at least one of said walls, said apex portion of the support structure having an opening formed therethrough, the upper end portion of said flexible suspension member extending through said opening, and means limiting the downward movement of said flexible suspension member, whereby upon upward movement of said flexible suspension member through said opening said opposite end edge portions of the walls will be lifted and subsequently will swing between said pair of suspension members so as to turn the grid over.

2. A griller comprising a grid formed by a double layer of wire mesh shaped as an isosceles trapezoid having opposite sides, three suspension members for said grid, two of said suspension members being loosely attached to opposite corners of one side of said grid and the third suspension member being flexible and being loosely attached to the opposite side of said grid, a tripod supporting structure having an apex portion, an attachment for the three suspension members at said apex portion of said supporting structure, said apex portion having an aperture therethrough, and said flexible support member extending through said aperture.

3. A griller as claimed in claim 2, in which the double layer of wire mesh is in two parts, fastened together to hinge on the long side of the trapezoid.

4. A griller as claimed in claim 2, in which the suspension members are all approximately the same length to allow the grid to be suspended centrally from the apex portion of the tripod supporting structure.

5. A griller as claimed in claim 2, in which the flexible supporting member is attached to a ring above the apex portion of the tripod supporting structure.

References Cited in the file of this patent
UNITED STATES PATENTS

| | | |
|---|---|---|
| 124,306 | Wiley | Mar. 5, 1872 |
| 149,075 | Small | Mar. 31, 1874 |
| 317,431 | Allen | May 5, 1885 |
| 465,017 | Eller | Dec. 15, 1891 |
| 513,103 | Groos | Jan. 23, 1894 |
| 1,354,716 | Beardsley | Oct. 5, 1920 |
| 2,213,483 | Benson | Sept. 3, 1940 |